United States Patent Office 3,164,605
Patented Jan. 5, 1965

3,164,605
PREPARATION OF 2-ANILINO-2-THIAZOLINES
Richard C. Sovish, Ben Lomond, Calif., assignor to The Dow Chemical Company, Midland, Mich., a corporation of Delaware
No Drawing. Filed Nov. 23, 1962, Ser. No. 239,801
4 Claims. (Cl. 260—306.7)

This invention concerns a novel method for making 2-anilino-2-thiazolines having the formula

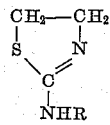

wherein R is an aryl radical of the benzene series.

Thiazolines of the type described are of value for their anesthetic properties. A known method for making them involves the reaction of 2-bromoethylamine with a phenyl isothiocyanate and rearrangement of the product with hydrochloric acid. In another synthesis, the phenyl isothiocyanate is reacted with ethylenimine and the resulting 1-(N-phenylthiocarbamyl)aziridine is rearranged to the desired 2-anilino-2-thiazoline. In each case, the amine reactant is difficult to handle and is extremely poisonous. Additionally, 2-bromoethylamine is not a readily available material.

A process for making the above thiazolines from easily handled and readily available materials has now been discovered. The reaction of phenyl isothiocyanate with amines having an active amino hydrogen atom to give the N-phenylthiocarbamyl derivatives is known. It has now been found that when 2-oxazolidinone is contacted with an aryl isothiocyanate in the presence of a small amount of a basic reacting tertiary amine at an elevated temperature, a reaction takes place which produces the corresponding 2-anilino-2-thiazoline as a principal product. A reaction temperature of about 50° C. to about 150° C. has been found to be suitable. Temperature below this level yield the expected thiocarbamyl oxazolidinone.

By the term aryl is meant radicals of the benzene series, that is, phenyl and substituted phenyl where the substituents are unreactive in the process. Radicals such as halophenyl, nitrophenyl, alkylphenyl, alkoxyphenyl, and phenyl having more than one such substitutent are included.

Tertiary amines in which the amino nitrogen has a basic reaction are effective catalysts. These include lower aliphatic tertiary amines such as triethylamine, tributylamine, benzyldimethylamine, and N-methyldipropylamine, and also heterocyclic tertiary amines such as 1,4-dimethylpiperazine, 1-methylpiperidine, and pyridine. The quaternary ammonium hydroxides of these amines are also effective and are considered their equivalents for the purposes of this specification. Lower aliphatic tertiary amines are preferred.

The amount of amine catalyst required is any quantity sufficient to have a significant effect on the reaction mixture. Amounts of 0.05–5 percent by weight of the reaction mixture are suitable.

Inert solvents such as ether or saturated hydrocarbons may be used if desired but are not necessary.

The proportion in which the aryl isothiocyanate and the oxazolidinone reactants are employed is not critical, for the reaction will occur at any proportion to the extent to which the lesser component is present. For obvious reasons, it is ordinarily most convenient to use the two reactants in approximately the theoretical mole to mole ratio.

The process as described above apparently involves a reaction and a rearrangement which take place more or less at the same time. The invention can, therefore, be applied also as a simple rearrangement whereby a 3-(N-arylthiocarbamyl)-2-oxazolidinone, whether made by this reaction or by another, is contacted with a tertiary amine as specified. A rearrangement of this type proceeds at a slower rate than the concurrent reaction and rearrangement first described and it is usually necessary in this case to heat the reaction mixture over a period of hours. Temperatures of about 50–150° C. are suitable. The rearrangement is shown by the following equation:

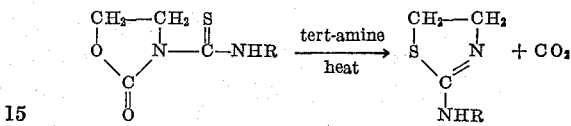

Examples 1 and 2 illustrate a typical preparation by each of these methods.

Example 1

Three drops of triethylamine was added to a mixture of 10 g. of phenyl isothiocyanate and 10 g. of 2-oxazolidinone. There was an immediate exothemic reaction and a yellow solid separated from the solution. This solid was separated and recrystallized from methanol, yielding white crystals melting at 161–2° C. This material was further identified by elemental and spectroscopic analyses as being 2-anilino-2-thiazoline.

Example 2

3-(N-phenylthiocarbamyl)-2-oxazolidinone to which there had been added a few drops of triethylamine was heated on the steam bath for 48 hours. Analysis of the reaction mixture showed that 37 percent of the oxazolidinone had been converted to 2-anilino-2-thiazoline.

Similar results are obtained when the triethylamine used in these examples is replaced by other tertiary amines having a basic nitrogen atom or their quaternary ammonium hydroxides. Also, analogous thiazolines are formed when the phenyl moiety in each example is replaced by substituted phenyl such as tolyl, chlorophenyl, nitrophenyl, methoxyphenyl, or the like.

I claim:

1. A process for making a 2-anilino-2-thiazoline of the formula

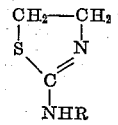

which comprises heating a compound of the formula

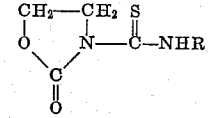

wherein R is in each of the above formulas a phenyl radical free of substituents other than halogen, nitro, alkyl, and alkoxy at a temperature of about 50° C. to about 150° C. in the presence of a small but effective amount of a tertiary amine base.

2. The process of claim 1 wherein R is phenyl.

3. A process for making a 2-anilino-2-thiazoline which comprises reacting by contacting 2-oxazolidinone with a phenyl isothiocyanate as defined in claim 1 in the presence of a small but effective amount of a tertiary amine base at about 50° C. to about 150° C.

4. The process of claim 3 wherein the isothiocyanate is phenyl isothiocyanate.

References Cited in the file of this patent

Hackh's Chemical Dictionary (Philadelphia, 1944), page 110.